(12) United States Patent
Seligmann et al.

(10) Patent No.: US 7,734,710 B2
(45) Date of Patent: Jun. 8, 2010

(54) PRESENCE-BASED HYBRID PEER-TO-PEER COMMUNICATIONS

(75) Inventors: Doree Duncan Seligmann, New York, NY (US); Xueshan Shan, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 1052 days.

(21) Appl. No.: 11/240,076

(22) Filed: Sep. 30, 2005

(65) Prior Publication Data

US 2007/0067443 A1    Mar. 22, 2007

Related U.S. Application Data

(60) Provisional application No. 60/719,397, filed on Sep. 22, 2005.

(51) Int. Cl.
  G06F 15/16  (2006.01)
  G06F 15/173  (2006.01)
  G06F 15/177  (2006.01)

(52) U.S. Cl. .............. 709/207; 709/204; 709/205; 709/217; 370/260; 370/389; 705/50

(58) Field of Classification Search ......... 709/203–207, 709/217–224
See application file for complete search history.

(56) References Cited

U.S. PATENT DOCUMENTS

| 2002/0099770 | A1  | 7/2002 | Lindo et al. |
| 2004/0041836 | A1* | 3/2004 | Zaner et al. ............... 345/751 |
| 2004/0153506 | A1  | 8/2004 | Ito et al. |
| 2004/0224642 | A1* | 11/2004 | Kim et al. ................. 455/74.1 |
| 2005/0044147 | A1* | 2/2005 | Yap .......................... 709/205 |

(Continued)

FOREIGN PATENT DOCUMENTS

WO    01/45322 A2    6/2001

(Continued)

OTHER PUBLICATIONS

A Platform and applications for mobile peer-to-peer communications, Takeshi Kato et al., pp. 1-6, Feb. 14, 2005.*

(Continued)

*Primary Examiner*—Haresh N Patel
(74) *Attorney, Agent, or Firm*—DeMont & Breyer, LLC

(57) ABSTRACT

A method and an apparatus are disclosed for improving the flow of data traffic between clients and servers by determining, in an enhanced hybrid peer-to-peer network, when a client telecommunications terminal should share its data with one or more peers, instead of transmitting that data to the servers. A "super-peer" client terminal in the hybrid peer-to-peer network is responsible for determining when to share data with peers and when to transmit data to the servers. The telecommunications terminal (i) shares data with other terminals when a particular user's presence has changed and (ii) transmits data to the enterprise servers when the overall group's presence that corresponds to the terminal's peer group has changed. The system of the illustrative embodiment aggregates presence and routes communications via peer-to-peer networking, instead of via client-to server-to peer networking, thereby reducing the load on the enterprise servers and lessening the occurrences of single points-of-failure.

12 Claims, 11 Drawing Sheets

U.S. PATENT DOCUMENTS

| | | |
|---|---|---|
| 2005/0138181 A1 | 6/2005 | Gallet et al. |
| 2005/0180418 A1 | 8/2005 | Andersen et al. |
| 2005/0286519 A1* | 12/2005 | Ravikumar et al. ......... 370/389 |
| 2006/0045030 A1* | 3/2006 | Bieselin ...................... 370/260 |
| 2006/0095376 A1* | 5/2006 | Mitchell et al. ............... 705/50 |
| 2007/0022174 A1* | 1/2007 | Issa ............................ 709/217 |
| 2007/0226299 A1* | 9/2007 | Shaffer et al. ............... 709/206 |
| 2007/0271337 A1* | 11/2007 | Olson ......................... 709/204 |
| 2008/0040184 A1* | 2/2008 | Cragun et al. .................. 705/8 |

FOREIGN PATENT DOCUMENTS

| | | |
|---|---|---|
| WO | 2005/078998 A1 | 8/2005 |

OTHER PUBLICATIONS

Gravelle, Mara, "CA Application No. 2,559,660 Office Action Dec. 8, 2009", , Publisher: CIPO, Published in: CA, pp. 1-2.

* cited by examiner

PRESENCE-BASED HYBRID PEER-TO-PEER COMMUNICATIONS

REFERENCE TO RELATED APPLICATIONS

This application claims the benefit of U.S. Provisional Application 60/719,397, filed Sep. 22, 2005, entitled "Enhanced Hybrid Peer-To-Peer Communications," which is also incorporated herein by reference.

FIELD OF THE INVENTION

The present invention relates to telecommunications in general, and, more particularly, to hybrid peer-to-peer communications based on presence.

BACKGROUND OF THE INVENTION

FIG. 1 depicts telecommunications system 100 in the prior art. System 100 comprises terminals 101-1 through 101-H, wherein H is a positive integer; gateway 103; and enterprise servers 104-1 through 104-I, wherein I is a positive integer, interconnected as shown. Each terminal 101-$h$, for h=1 through H, is associated with user 102-$h$.

Telecommunications terminal 101-$h$, wherein h has a value of between 1 and H, inclusive, is a wireless device, such as a cellular telephone, a personal digital assistant (PDA), a Smartphone, a softphone with WiFi connectivity, and so forth. Terminal 101-$h$, as a client device, provides access to both enterprise services and other telecommunications services, such as voice calling, to user 102-$h$. The enterprise services include email, voice mail, web access, and presence-based services. These services are available through one or more servers, such as enterprise servers 104-1 through 104-I. Gateway 103 provides terminals 101-1 through 101-H controlled access to the enterprise services available through servers 104-1 through 104-I. Gateway 103 controls interaction between terminal 101-$h$ and the enterprise servers such that access to the associated enterprise services is provided securely.

Users 102-1 through 102-H are, for example, enterprise mobile workers who may be traveling, telecommuting, or otherwise in a location remote from the enterprise itself. Such users generally want to be able to access enterprise services from their wireless devices. Extending enterprise services to these users in a mobility environment can yield substantial improvements in productivity, at least in part through communication that is more efficient and by supporting collaboration among groups.

Presence-based (or "presence-aware") communications is an emerging area that is transforming how mobile enterprise workers communicate and interact with each other. Communications that are based on presence monitor the availability of a worker for determining the best way to contact the worker and to utilize the worker's expertise, for example, to address an issue for a customer. Referring to FIG. 1, telecommunications terminal 101-$h$ can determine its user's availability, for example, by monitoring the user's terminal-related activity. Each of terminals 101-1 through 101-H continually reports its user's changing availability to one or more of the enterprise servers responsible for tracking presence status. The responsible servers, in turn, report out the changing availabilities of the various users to terminals 101-1 through 101-H.

In some applications, enterprise mobile workers communicate and interact constantly with enterprise services and their fellow group members. Consequently, pure client/server communications can result in a large amount of data traffic that is chronically present between the client telecommunications terminals and the enterprise servers. In addition, if communications between many clients and their enterprise servers rely on each user's presence, then the determination, processing, and tracking of presence by the servers can load up the communications links between the reporting terminals to the servers, as well as the servers themselves.

What is needed is a way to reduce the overall data traffic between clients and servers while still providing for client/server communications when required.

SUMMARY OF THE INVENTION

The present invention improves the flow of data traffic between clients and servers by determining, in an enhanced hybrid peer-to-peer network, when a client telecommunications terminal should share its data with one or more peers, instead of transmitting that data to the servers. In a hybrid peer-to-peer network, client terminals are able to communicate with each other through a routing intelligence that is distributed among the terminals, as well as being able to communicate with one or more servers. In accordance with the illustrative embodiment of the present invention, a "super-peer" client terminal is responsible for determining when to share data with peers and when to transmit data to the servers. The telecommunications terminal (i) shares data with other terminals when a particular user's presence has changed and (ii) transmits data to the enterprise servers when the overall group's presence that corresponds to the terminal's peer group has changed. As a result, the system of the illustrative embodiment aggregates presence and routes communications via peer-to-peer networking, instead of via client-to server-to peer networking, thereby reducing the load on the enterprise servers and lessening the occurrences of single points-of-failure.

In the illustrative embodiment, two or more telecommunications terminals, which as a group are registered with a gateway, form a peer-to-peer network based on logical proximity. The terminals, not being constrained to physical proximity, can be out of direct communications range with each other, in different service provider networks, or using different bearer channel protocols, alone or in combination with each other. The communications between peers or between client and server can be through either long-range networks with bearer channel protocols based on GSM/GPRS, CDMA, and so forth, or through short-range networks with bearer channel protocols based on WiFi, Bluetooth, and so forth. The peer-to-peer communication and data exchange between terminals in the same group are triggered by changes in the presence of a peer.

A change in the user presence for a particular user can be triggered by changes in device-related presence, user activities, and communications-related events at the user's telecommunications terminal. The terminal monitors user activity (e.g., keypad use, etc.), voice channel use, and the terminal's own device status (e.g., amount of battery charge, etc.). These fine-grained presence indicators are aggregated together to make overall determinations about a user's presence. The super-peer terminal, for example, shares this information with its peer terminals, but does not necessary involve the server with this type of information.

A change in the group presence for a particular user group can be triggered by the collective user presences having changed for the group's user members. For example, if group availability is predicated on whether at least one user group member is available and if the last available member becomes unavailable, then the group presence status changes from "available" to "unavailable." Subsequently, if another member becomes available, then the group's presence status changes back to "available." The super-peer terminal reports the changes in the group presence to one or more enterprise servers, in accordance with the illustrative embodiment.

The system of the illustrative embodiment of the present invention is advantageous over some systems in the prior art for several reasons. First, the client terminal of the illustrative embodiment coordinates with peers and enterprise servers based on presence information and available communications resources to trigger more efficient communication flows; this benefits the user, as well as the resources involved. Second, the improved efficiency in those flows relieves data traffic congestion, particularly along communications links to the enterprise servers. Third, as the presence-tracking is performed by the peer group and the super peer within that group—as opposed to the enterprise server—the improved system reduces the dependency on individual resources, as well as the likelihood of a single point of failure such as at an enterprise server.

The illustrative embodiment of the present invention comprises: detecting, at a first telecommunications terminal, a change in a presence status, wherein the user of the first telecommunications terminal belongs to a user group; transmitting a first datum to a server when the presence status is group presence-based for a user group that includes the user of the first telecommunications terminal; and transmitting a second datum to a second telecommunications terminal based on (i) the detecting of the change in the presence status and (ii) whether the user of the second telecommunications terminal also belongs to the user group.

DETAILED DESCRIPTION

The following terms are defined for use in this Specification, including the appended claims:

The term "presence status" is defined as the state of availability of the user, if the presence status is user presence-based, or the state of availability of the group, if the presence status is group presence-based.

The term "user presence" is defined as the condition of whether a user is available. User presence is related to a single user. User presence can be based on individual, fine-grained indicators of presence such as device presence, user activity, and so forth.

The term "group presence" is defined as the condition of whether a user group is available. Group presence is related to the user group being regarded as a whole and is based on the individual user presences of the users in the group. For example, group presence can be based on the availability of (i) an individual user from the user group, (ii) a quorum of users from the user group, (iii) a majority of users from the user group, or (iv) all members of the user group.

The term "aggregated presence" is defined as presence being determined from the bringing together of presence indicators from various sources to present a unified and aggregated view of an overall presence status. For example, aggregated user presence is the result of having considered information from the user's devices, applications, and attributes such as networks and locations to present a single, representative view of the user's presence status.

The term "fine-grained presence" is defined as a component in the determining of aggregated presence. For example, a single property's change of state at a user's device can be used as a presence indicator (i.e., a "clue") in making a determination of user availability.

The term "physical proximity" is defined as being near in space. For example, two users are in physical proximity to each other if they are within direct communication range with each other.

The term "logical proximity" is defined as being near in relationship. For example, two users are in logical proximity to each other if they are in the same user group.

The term "communication mode" is defined as a method for exchanging information between a client terminal and a server or between two client terminals. Examples of communication mode are Short Message Service (SMS), Web Services, and Session Initiation Protocol (SIP).

Figure 1:
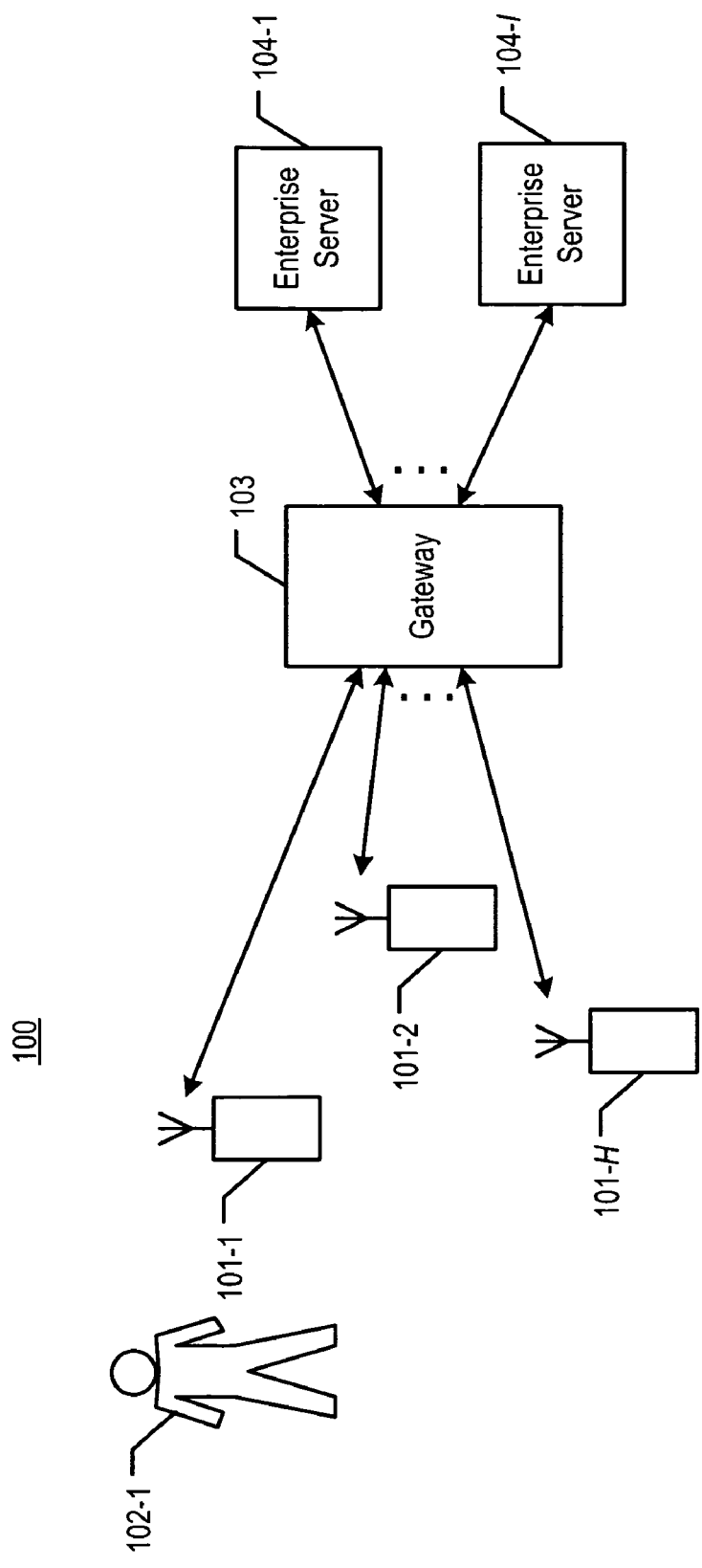
FIG. 1 depicts telecommunications system 100 in the prior art.
Figure 2:
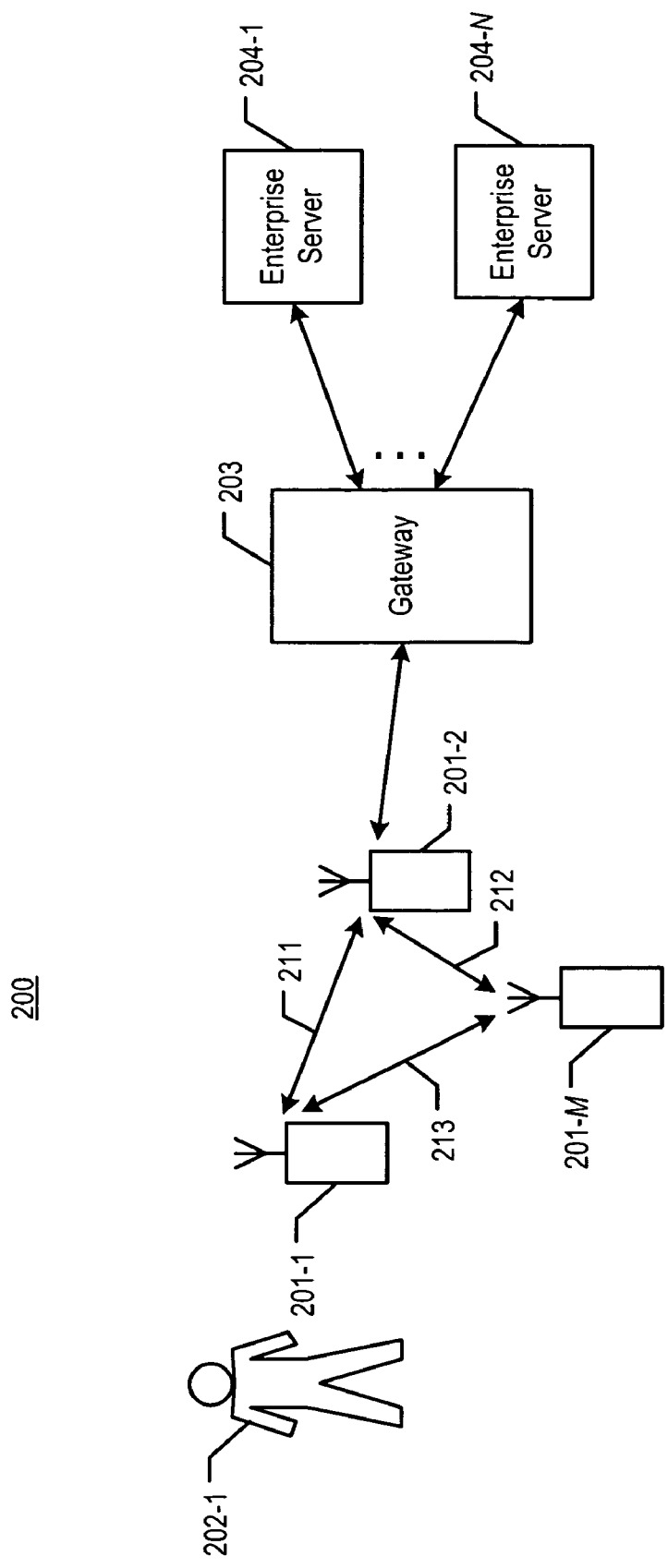
FIG. 2 depicts a first diagram of telecommunications system 200, in accordance with the illustrative embodiment of the present invention.

FIG. 2 depicts a diagram of telecommunications system 200, in accordance with the illustrative embodiment of the present invention. System 200 is a hybrid peer-to-peer network, as is known in the art, that comprises client telecommunications terminals 201-1 through 201-M, wherein M is a positive integer greater than one; gateway 203; and enterprise servers 204-1 through 204-N, wherein N is a positive integer; interconnected as shown. Each terminal 201-$m$, for m=1 through M, is associated with user 202-$m$, hereinafter known as "user $U_m$." One or more terminals in the set of telecommunications terminals 201-1 through 201-M, when referenced generically, are hereinafter referred to "telecommunications terminals 201" or "terminals 201."

Telecommunications terminal 201-$m$, wherein m has a value of between 1 and M, inclusive, is a wireless device, such as a cellular telephone, a personal digital assistant (PDA), a Smartphone, a softphone with WiFi connectivity, and so forth. The salient components of terminal 201-$m$ are described below and with respect to FIG. 4. Terminal 201-$m$, as a client device, provides access to both enterprise services via terminal 201-2 (as pictured) and other telecommunications services, such as voice calling, to user $U_m$. The enterprise services include email, voice mail, web access, and presence-based services. These services are available through one or more servers, such as enterprise servers 204-1 through 204-N.

Gateway 203 provides terminals 201-1 through 201-M controlled access to the enterprise services available through servers 204-1 through 204-N. Gateway 203 controls interaction between terminal 201-$m$ (via terminal 201-2) and enterprise servers 204-1 through 204-N such that access to the associated enterprise services is provided securely. This concept is disclosed, for example, in U.S. patent application Ser. No. 10/853,962, which is incorporated herein by reference. It will be clear to those skilled in the art, after reading this specification, how to make and use gateway 203 and servers 204-1 through 204-N.

Telecommunications terminal 201-$m$ is also able to perform the tasks described below and with respect to FIGS. 6 through 11, in accordance with the illustrative embodiment of the present invention. As part of those tasks, terminal 201-$m$ is able to function as either an equal peer or a super peer. An equal peer is able to communicate peer-to-peer with other terminals 201 in well-known fashion. A super peer, in addition to being able to communicate peer-to-peer with other terminals 201, is able to communicate with servers 204-1 through 204-N, on behalf of itself and its peers, in accordance with the illustrative embodiment. As depicted in FIG. 2, for example, terminal 201-2 is the super peer and the other terminals depicted are not super peers (i.e., they are equals of each other); therefore, terminals other than 201-2 communicate with servers 204-1 through 204-N through the super-peer terminal. Regardless of peer status, each of terminals 201 runs an onboard software agent, wherein the agent is responsible for peer-to-peer routing and communication, fine-grained presence detection and updating, event-triggered information exchange, and data-sharing with other terminals.

Communications paths 211, 212, and 213 are physical representations of the peer-to-peer communications exchanges between terminals 201-1 through 201-M. As depicted in FIG. 2, in some situations the transmission between two terminals occurs directly. For example, terminal 201-1 is within direct communications range of terminal 201-2 and transmits signals via path 211 (i.e., a wireless medium) to terminal 201-2 in well-known fashion without assistance from any other terminal. The direct communication between terminals can be based on physical proximity or logical proximity.

Figure 3:
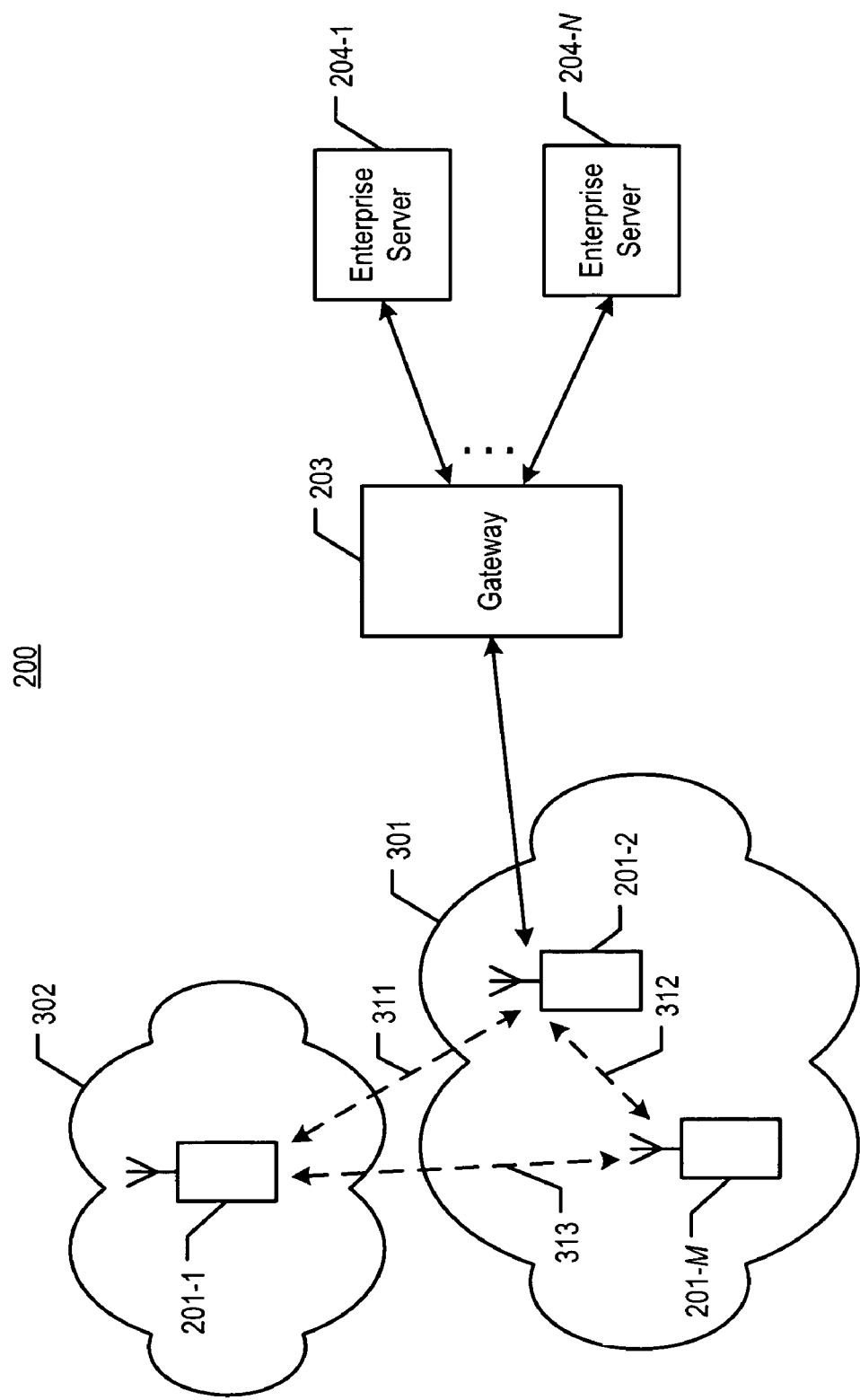
FIG. 3 depicts a second diagram of telecommunications system 200, in accordance with the illustrative embodiment of the present invention.

In other situations, the transmission between two terminals occurs indirectly through one or more networks, such as a landline network. Referring to the example depicted in FIG. 3, terminals 201-1 through 201-M are scattered across two different networks 301 and 302. Network 301 is considered a "short-range" network that uses a bearer channel, air-interface protocol such as IEEE 802.11, Bluetooth, and so forth; terminals in network 301 are often capable of communicating directly with each other. Network 302 is considered a "long-range" network that uses a bearer channel, air-interface protocol such as one that is cellular-based (e.g., GSM/GPRS, CDMA, etc.); terminals in network 302 typically communicate with each other typically through one or more intermediate systems, such as base stations and switching centers, even if the terminals are physically proximate to one other. Although networks 301 and 302 are depicted as being non-overlapping in space, networks 301 and 302 can be two different networks based on another characteristic, such as belonging to two different service providers (e.g., Boingo for WiFi and Verizon for cellular, etc.).

Communications paths 311, 312, and 313 are logical representations of the peer-to-peer communications exchanges between terminals 201-1 through 201-M. The actual transmissions between two terminals in FIG. 3, such as between terminals 201-1 and 201-2, traverse infrastructure such as WiFi access points, a landline network that comprises switches and routers, and cellular base stations. In other words, the physical paths between pairs of terminals are different from the logical paths depicted in FIG. 3.

Figure 4:
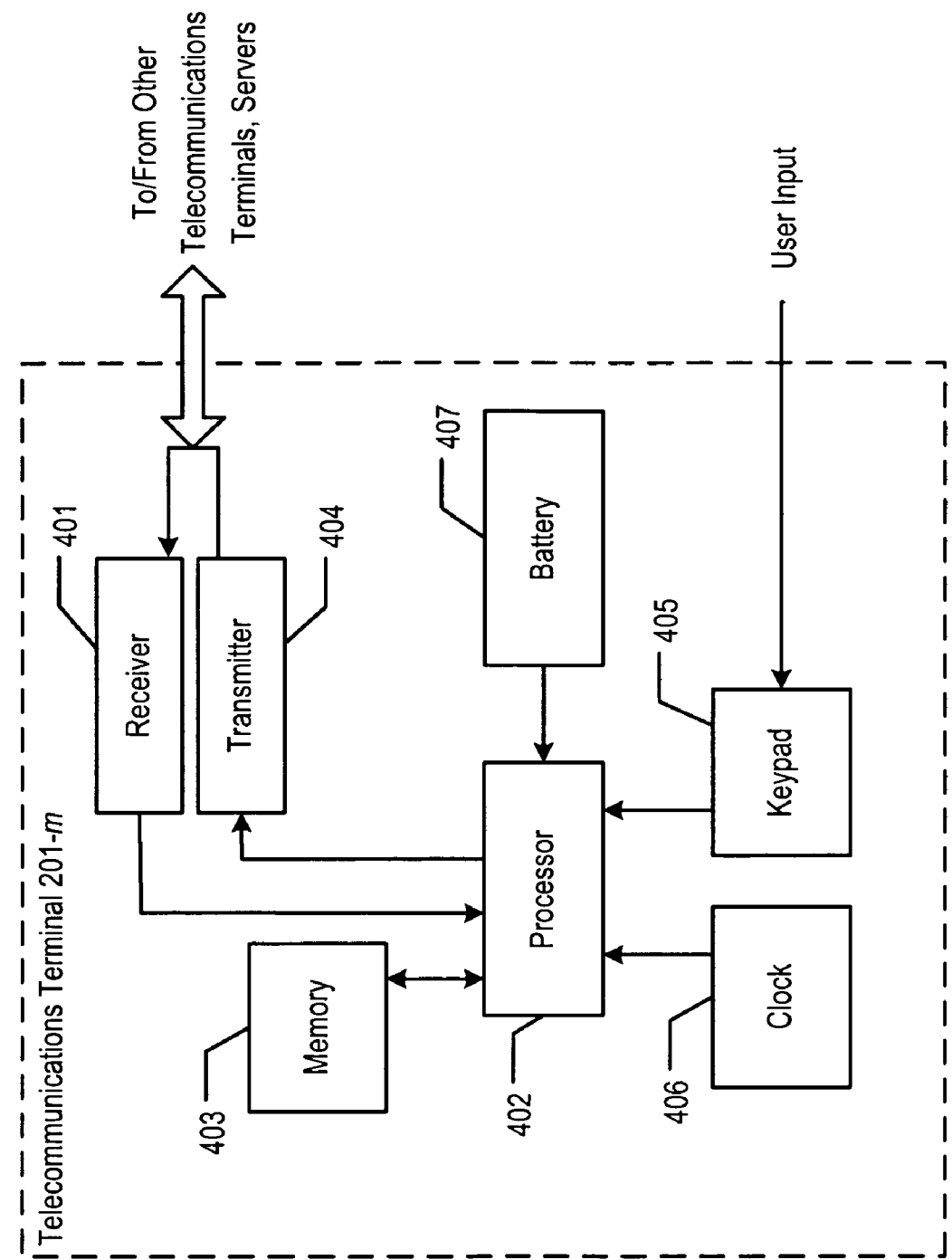
FIG. 4 depicts a block diagram of the salient components of telecommunications terminal 201-$m$, in accordance with the illustrative embodiment of the present invention.

FIG. 4 depicts a block diagram of the salient components of telecommunications terminal 201-$m$, in accordance with the illustrative embodiment of the present invention. Telecommunications terminal 201-$m$ comprises receiver 401, processor 402, memory 403, transmitter 404, keypad 405, clock 406, and battery 407, interconnected as shown.

Receiver 401 receives signals from other terminals 201 and—in the case of the super peer—from server 204-1 through 204-N, and forwards the information encoded in the signals to processor 402, in well-known fashion. In accordance with the illustrative embodiment, receiver 401 enables one or more wireless, physical layer interfaces. Such interfaces include (i) the interface for communicating voice via the voice traffic bearer channel as part of a call and (ii) the interface for exchanging data (e.g., presence data, call logs, etc.) with other terminals 201 and servers 204 via the data traffic bearer channel. Receiver 401 also enables various communication modes at the application level, such as Short Message Service, Web Services, and Session Initiation Protocol. It will be clear to those skilled in the art, after reading this disclosure, how to make and use receiver 401.

Processor 402 is a general-purpose processor that is capable of: receiving information from receiver 401, keypad 405, clock 406, and battery 407, as well as from a microphone; reading data from and writing data into memory 403; executing the tasks described below and with respect to FIGS. 6 through 11; and transmitting information to transmitter 404, as well as to a speaker and a video display. In some alternative embodiments of the present invention, processor 402 might be a special-purpose processor. In either case, it will be clear to those skilled in the art, after reading this disclosure, how to make and use processor 402.

Memory 403 stores the instructions and data used by processor 402. Memory 403 also stores the data that is described below and with respect to FIG. 5. It will be clear to those skilled in the art, after reading this disclosure, how to make and use memory 403.

Transmitter 404 receives information from processor 402, and outputs signals that-encode this information to other terminals 201 and servers 204-1 through 204-N, in well-known fashion. In accordance with the illustrative embodiment, transmitter 404 enables the same wireless, physical layer interfaces and communications modes as enabled by receiver 401. It will be clear to those skilled in the art, after reading this disclosure, how to make and use transmitter 404.

Keypad 405 is a character and user-selection input device as is well-known in the art that receives input from a user and transmits keypad signals representing that input. It will be clear to those skilled in the art how to make and use keypad 405.

Clock 406 maintains and distributes time and date information. It will be clear to those skilled in the art how to make and use clock 406.

Battery 407 provides electrical power to other components that make up terminal 201-$m$. Battery 407 holds an electrical charge, the amount of which being detectable by processor 402. It will be clear to those skilled in the art how to make and use battery 407.

Figure 5:
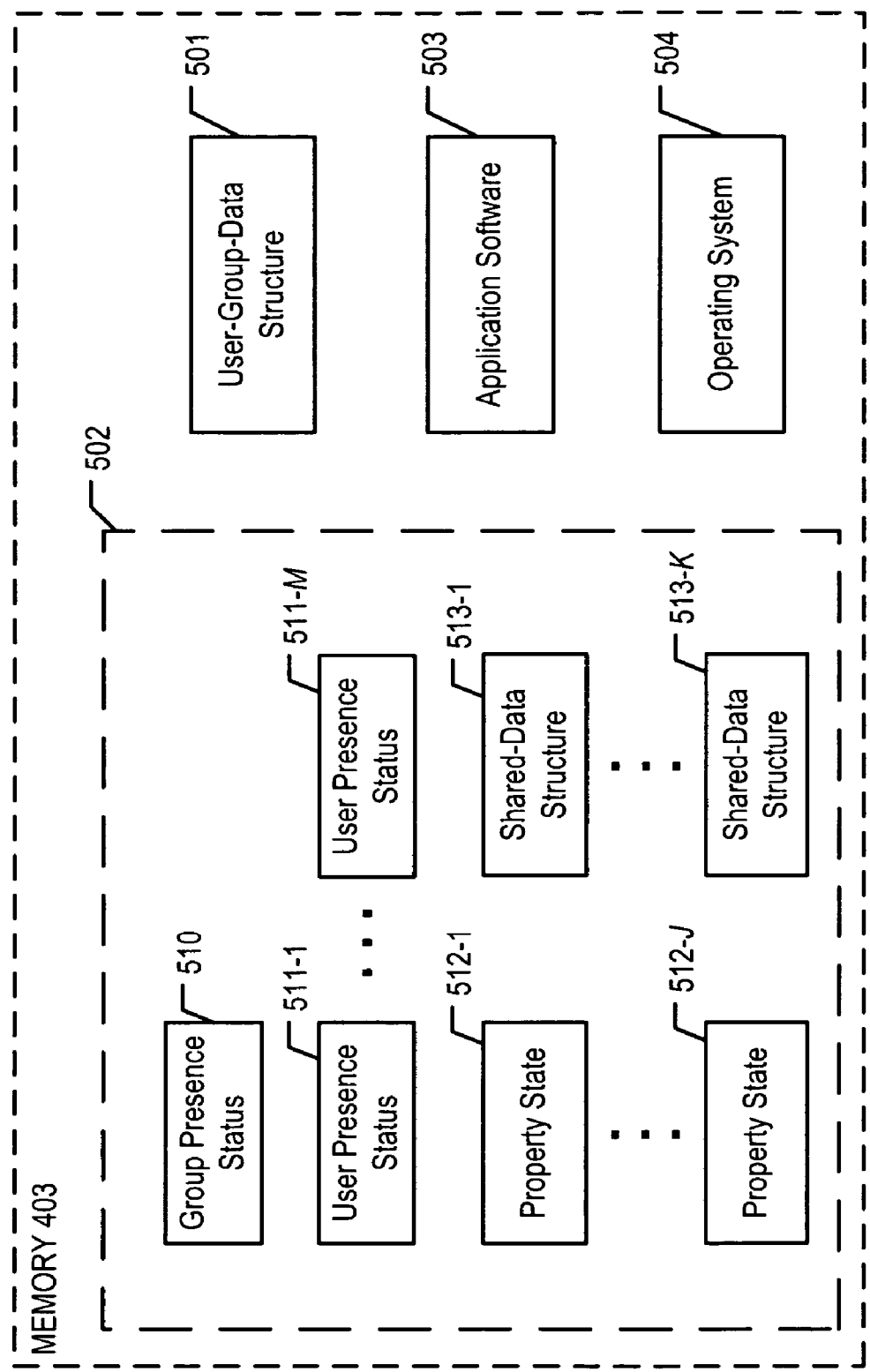
FIG. 5 depicts a block diagram of how information is stored and organized in memory 403 of terminal 201-$m$, in accordance with the illustrative embodiment of the present invention.

FIG. 5 depicts a block diagram of how information is stored and organized in memory 403 of terminal 201-$m$, in accordance with the illustrative embodiment of the present invention. The information stored in memory 403 comprises user-group-data structure 501, application-data structure 502, application software 503, and operating system 504. As will be appreciated by those skilled in the art, the information that is stored in memory 403 can be organized differently than what is depicted in FIG. 5.

User-group-data structure 501 is a file structure that comprises user-specific information about each user $U_m$ in the user group G with which terminals 201—as part of a terminal peer group—are associated, thereby defining the user group. User group 501 also comprises terminal-specific information about each user $U_m$'s telecommunications terminal 201-$m$. Terminal-specific information, for example, comprises the communications modes that each terminal supports.

Application-data structure 502 is a file structure that comprises group presence status 510, user presence status 511-1 through 511-M; property state 512-1 through 512-$j$; and shared-data structure 513-1 through 513-K, wherein M, 3, and K are positive integers. Group presence status 510 represents the current status of the group presence status. User presence status 511-$m$, wherein m has a value of between 1 and M, inclusive, represents the current status of the user presence of user $U_m$.

Property state 512-$j$, wherein j has a value of between 1 and 3, inclusive, represents the current state of a particular property. Property state 512-1 represents the current battery charge level. Property state 512-2 represents the state of a first terminal-related user activity, such as use of keypad 405. Property state 512-3 represents the current battery charge level. Property state 512-4 represents whether user $U_m$ is currently engaged on a voice call. Property state 512-5 represents the state of a data network's availability. Other property states can be tracked and used by terminal 201-$m$, as those who are skilled in the art will appreciate.

Shared-data structure 513-$k$, wherein k has a value of between 1 and K, inclusive, is a file structure that comprises information for a particular category of data that is shared with other terminals 201 or servers 204-1 through 204-N, separately or in combination. Other shared data can be tracked and used by terminal 201-$m$, as those who are skilled in the art will appreciate, other than what is explicitly described below.

Shared-data structure 513-1 stores the user group contact list. User $U_m$'s contact list segment comprises entries for each contact made in the course of users $U_1$ through $U_m$ collaborating as a group such as, but not limited to: contact name, title, address, phone number(s), speed dial information, email address, and notes.

Shared-data structure 513-2 stores the user group call log. The call log is a record of the user group's collective call activity that consists of one or more call log entries, where each call log entry represents a call event. The call log comprises one or more of the following:

i. The calls that are made and completed to each user $U_m$ of the user group (i.e., "incoming call events");

ii. The calls that are originated by each user $U_m$ of the user group (i.e., "outgoing call events"); and iii. The calls that are made, but not completed, to each user $U_m$ of the user group (i.e., "missed call events").

The call log, of the illustrative embodiment, illustrates a record that consists of call log entries that represent telephone call events. It will be clear to those skilled in the art, however, how to make and use a call log that provides a record of message activity, where the record of message activity is either integrated with or segregated from the record of telephone call activity. Examples of such messages include email messages, Short Message Service [SMS] messages, Multimedia Message Service [MMS] messages, Instant Messaging [IM] messages, and so forth. A call log that provides a record of message activity is also known as a "message log."

Shared-data structure 513-3 stores the user group service history. The service history is a record of the collective actions taken by the user group in performing tasks that require one or more areas of expertise associated with the user group or other resources (e.g., enterprise services, etc.).

Application software 503 is the software portion of the system described below and with respect to FIGS. 6 through 11. Operating system 504 is an operating system that performs input/output, file and memory management, and all of the other functions normally associated with operating systems, in well-known fashion. In accordance with the illustrative embodiment, operating system 504 is the Symbian operating system, as is known in the art. In some alternative embodiments, another type of operating system is used. It will be clear to those skilled in the art how to make and use operating system 504.

Figure 6:
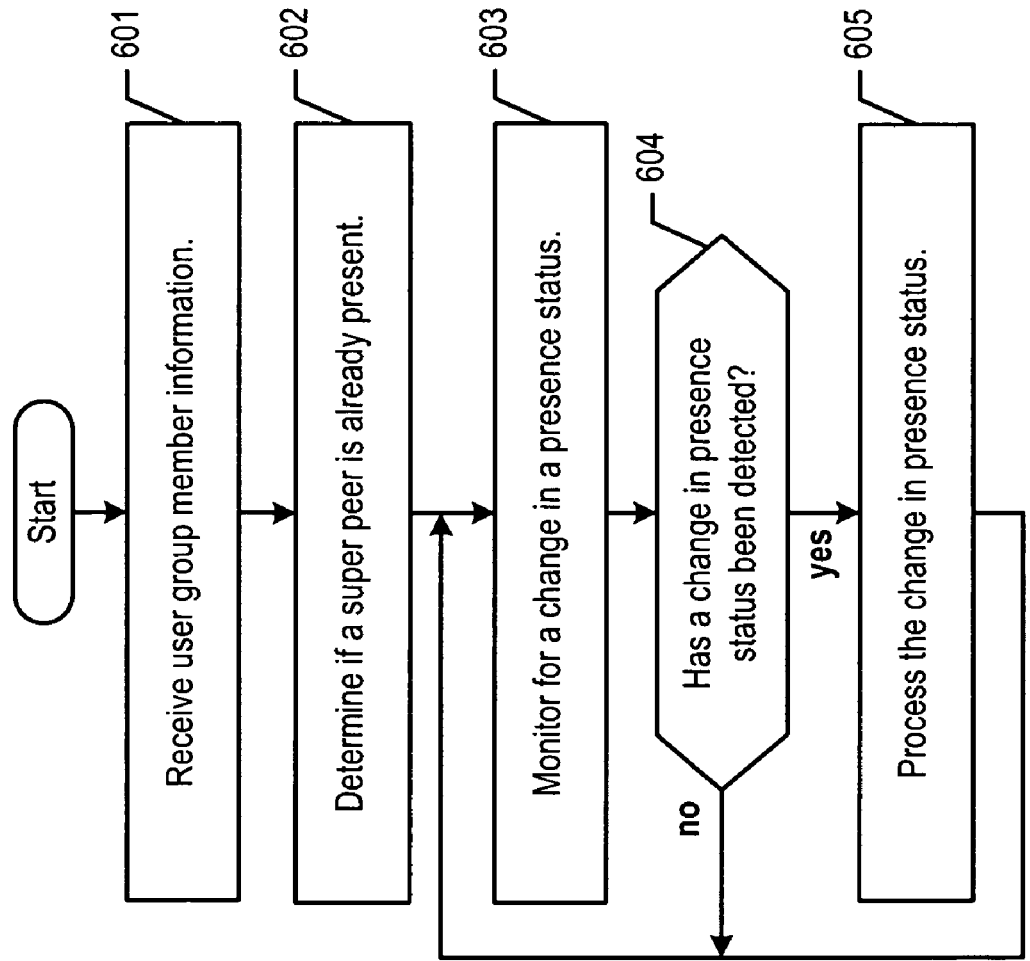
FIG. 6 depicts a flowchart of the salient tasks that are associated with communicating with one or more terminals 201 or server 204-1 through 204-N, in accordance with the illustrative embodiment of the present invention.

FIG. 6 depicts a flowchart of the salient tasks that are associated with communicating with one or more terminals 201 or server 204-1 through 204-N, separately or in combination, in accordance with the illustrative embodiment of the present invention. It will be clear to those skilled in the art which tasks depicted in FIG. 6 can be performed simultaneously or in a different order than that depicted.

For clarity purposes, the disclosed tasks that follow are described from the perspective of a first telecommunications terminal, namely terminal 201-2, executing the tasks and subtasks. It is also assumed that terminal 201-2's user $U_2$ is in a user group, along with user $U_1$ of terminal 201-1 and users $U_3$ through $U_M$ of terminals 201-3 through 201-M. As those who are skilled in the art will appreciate, each of terminals 201-1 and 201-3 through 201-M is also capable of executing the tasks described with respect to FIGS. 6 through 11. Therefore, shared data that comprise portions of application-data structure 502 can arrive at terminal 201-2 asynchronously from the other terminals. Furthermore, some terminals might be unavailable to communicate with terminal 201-2 at any given point in time; for example, terminal 201-1 might be powered off. As those who are skilled in the art will appreciate, the fact that one or more terminals might not be in a state to communicate with terminal 201-2 does not affect terminal 201-2's ability to execute the described tasks.

At task 601, terminal 201-2 receives information on the user group of which user $U_2$ is a member. The received information can come from another terminal, can be downloaded from the server, or arrive by other means. Terminal 201-2 stores the information into user-group-data structure 501.

At task 602, terminal 201-2 determines if a super peer is present among the terminals 201 peer group stored as part of user-group-data structure 501. The operations that are associated with task 602 are described below and with respect to FIG. 7.

At task 603, terminal 201-2 monitors for a change in presence status, either in the user or group presence status. The operations that are associated with task 603 are described below and with respect to FIG. 8.

At task 604, terminal 201-2 determines if a change in presence status has been detected, based on the monitoring and presence aggregation performed at task 603. If a change has been detected, control proceeds to task 605. Otherwise, task execution proceeds back to task 603.

At task 605, terminal 201-2 processes the change in presence status. The operations that are associated with task 605 are described below and with respect to FIG. 9. After task 605, task execution proceeds back to task 603.

Figure 7:
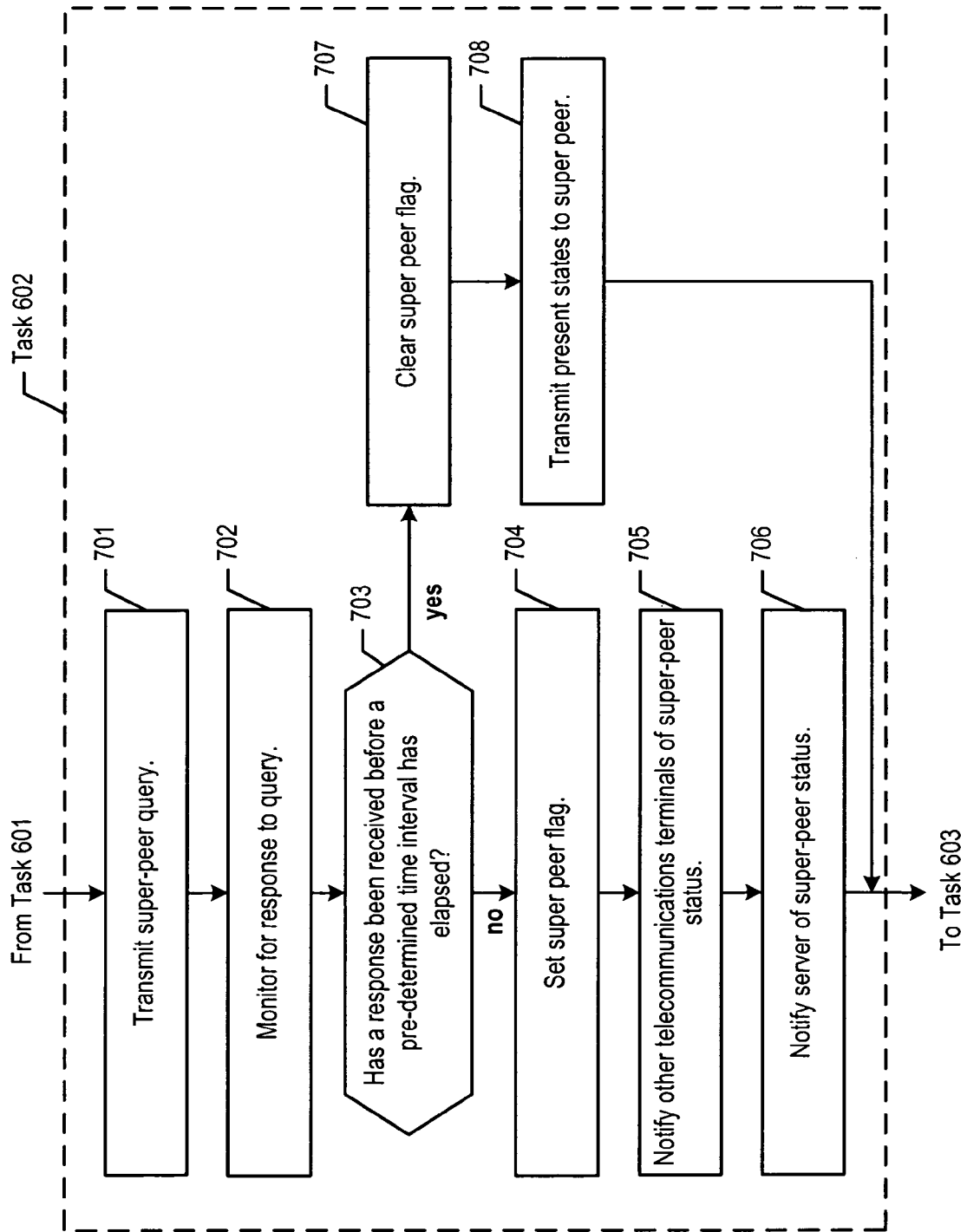
FIG. 7 depicts a flowchart of the salient operations in determining if a super peer is present among terminals 201.

FIG. 7 depicts a flowchart of the salient operations that are associated with task 602 in determining if a super peer is present among terminals 201, in accordance with the illustrative embodiment of the present invention. It will be clear to those skilled in the art which tasks depicted in FIG. 7 can be performed simultaneously or in a different order than that depicted.

At task 701, terminal 201-2 transmits a super-peer query to the other telecommunications terminals in its user's user group to determine if another terminal is already the super peer for the user group.

At task 702, terminal 201-2 monitors for a response to the query, wherein the response is to be received within a pre-determined time interval of having transmitted the query. It will be clear to those skilled in the art how to establish the pre-determined time interval.

At task 703, terminal 201-2 determines if a response has been received to the query before the interval has lapsed. If a response has been received, task execution proceeds to task 707. Otherwise, task execution proceeds to task 704.

At task 704, having determined that a super peer does not exist for the user group, terminal 201-1 establishes itself as the super peer and sets its super-peer flag.

At task 705, terminal 201-2 notifies other telecommunications terminals associated with the user group of its super-peer status.

At task 706, terminal 201-2 notifies the server of its super-peer status. Task execution then proceeds to task 603.

At task 707, having determined that another terminal is the super peer, terminal 201-2 clears its super-peer flag and stores the identity of the super-peer telecommunications terminal.

At task 708, terminal 201-2 transmits its present states (e.g., its user's presence status, etc.) to the super-peer telecommunications terminal. Task execution then proceeds to task 603.

Figure 8:
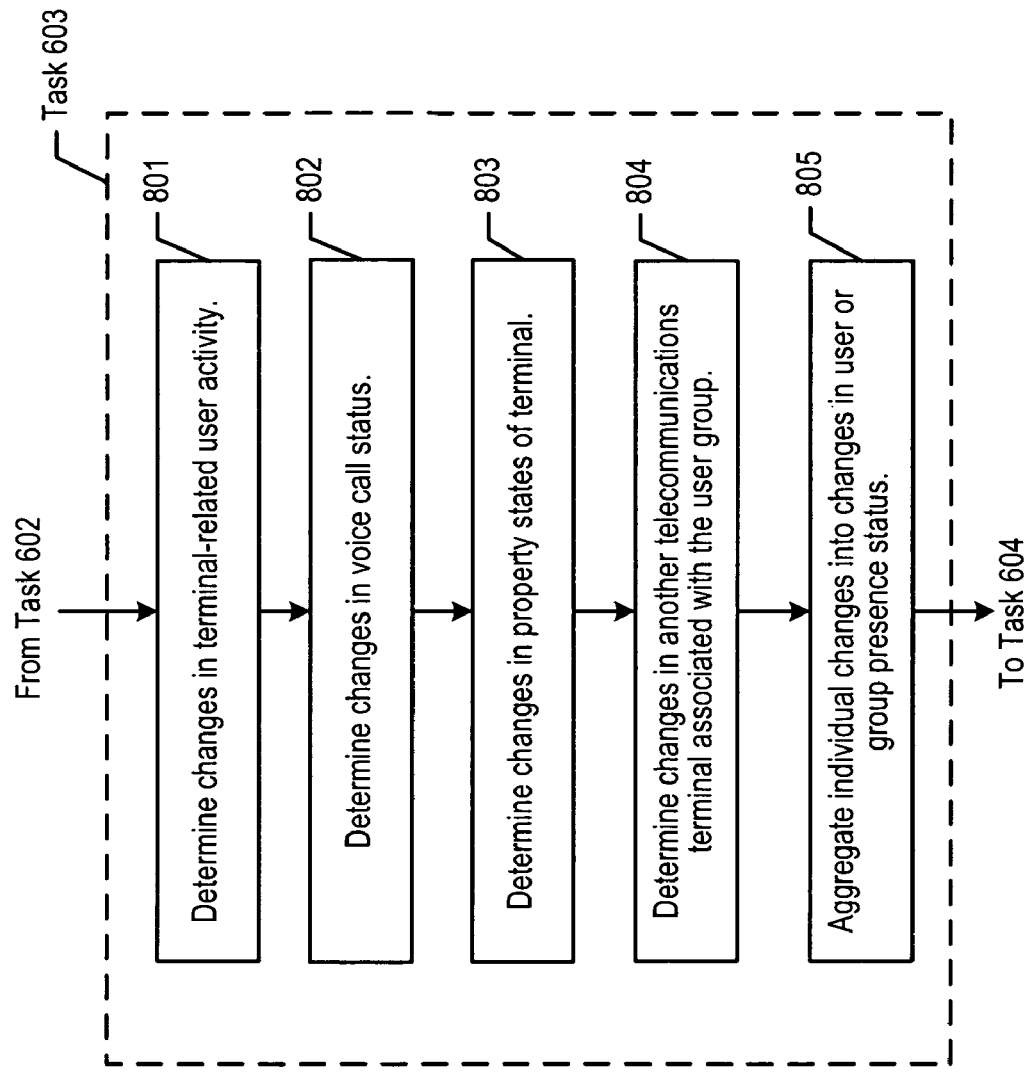
FIG. 8 depicts a flowchart of the salient operations in monitoring for a change in presence status.

FIG. 8 depicts a flowchart of the salient operations that are associated with task 603 in monitoring for a change in presence status, in accordance with the illustrative embodiment of the present invention. Tasks 801 through 803 are related to monitoring property state changes internal to terminal 201-2, and task 804 is related to monitoring changes in presence external to terminal 201-2 (i.e., internal to other terminals). It will be clear to those skilled in the art which tasks depicted in FIG. 8 can be performed simultaneously or in a different order than that depicted.

Figure 10:
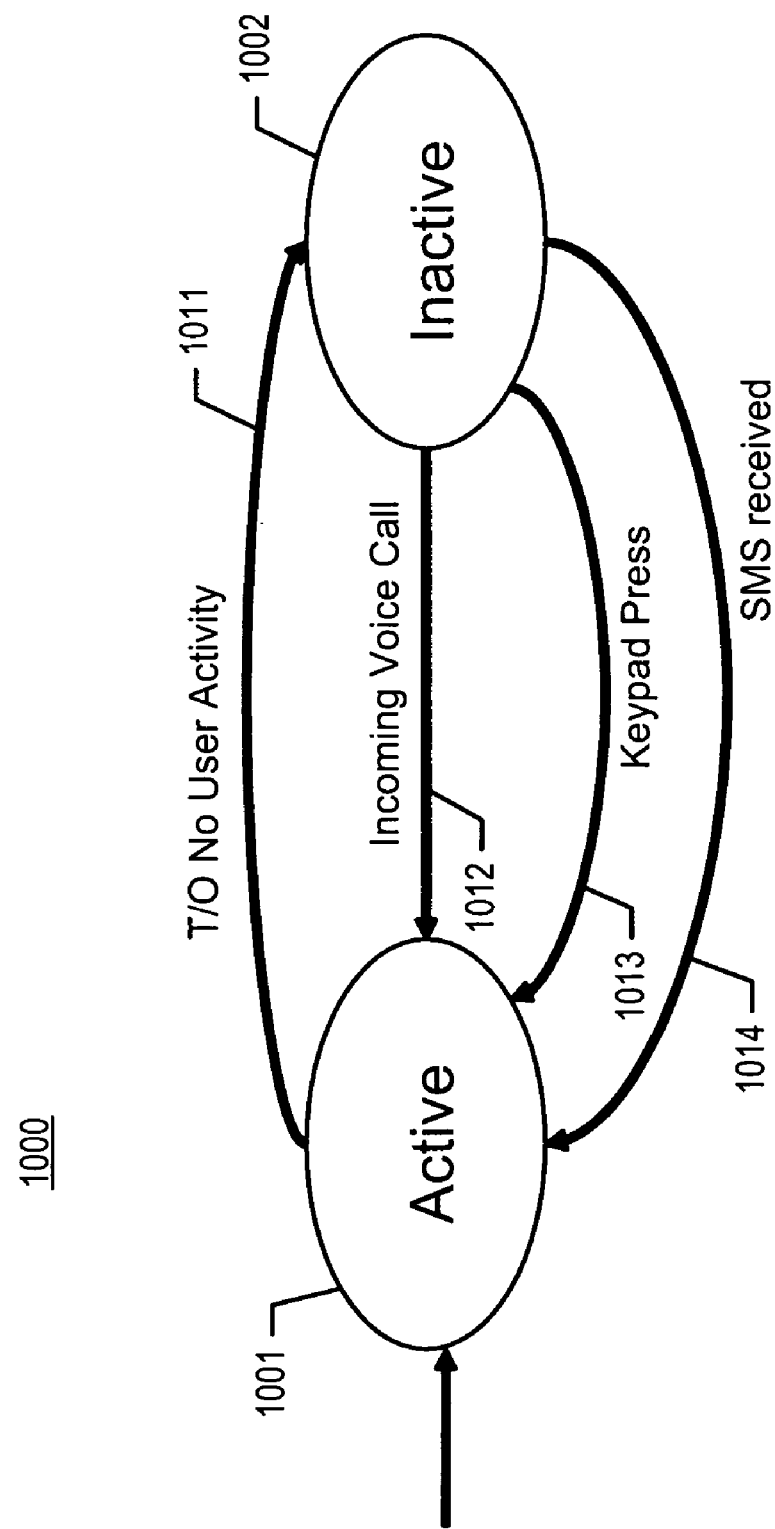
FIG. 10 depicts the tasks depicts a state diagram related to monitoring the activity of a user at a terminal.

At task 801, terminal 201-2 determines whether a change has occurred in a terminal-related user activity. Examples of events that can result in a change occurring include (i) detecting a timeout since the last detected activity, (ii) activity related to handling an incoming call, (iii) activity related to handling an incoming Short Message Service message, (iv) activity related to keypad use, and so forth. FIG. 10 depicts a state diagram of user activity.

Figure 11:
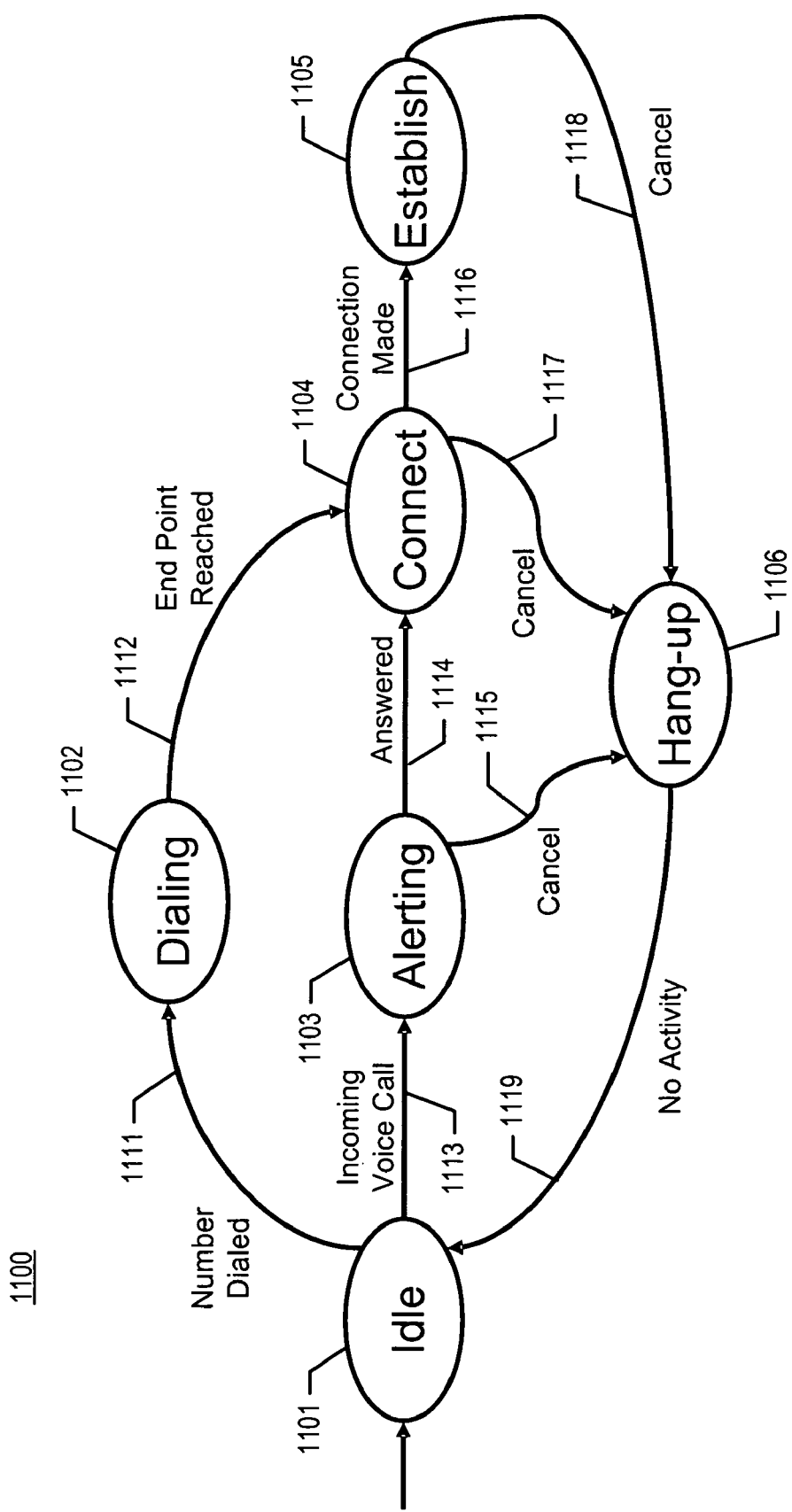
FIG. 11 depicts the tasks depicts a state diagram related to monitoring a user's voice call activity, in accordance with the illustrative embodiment of the present invention.

At task 802, terminal 201-2 determines whether a change has occurred in voice call status. Examples of events that can result in a change occurring include (i) the user answering a voice call and (ii) the user hanging up on a voice call. In accordance with the illustrative embodiment, terminal 201-2 monitors voice call-related activity because if a user, for example, is on a voice call with one customer, then that user is unavailable to handle another call from another customer. FIG. 11 depicts a state diagram of voice call activity.

At task 803, terminal 201-2 determines whether a change has occurred in one or more property states of the terminal itself. In a first example, terminal 201-2 monitors the availability of the data network. If the data network is not available, terminal 201-2 might determine that Short Message Service will be used as the new communication mode for transmitting messages peer-to-peer or between client and server, or both. In a second example, terminal 201-2 monitors the charge of its battery 407. A low-battery state, possibly determined by the charge level dropping below a pre-determined threshold, is used as the basis of super-peer switching or out-of-service forecasting.

At task 804, terminal 201-2 receives a datum or data from another telecommunications terminal in the terminal's peer group and determines if a presence change has occurred based on the received data. For example, the data might indicate that another user has become available or unavailable, which might affect group user presence.

At task 805, terminal 201-2 aggregates together one or more of the changes that have been determined at tasks 801 through 803 to have occurred, in order to update the user presence status of user $U_2$. Terminal 201-2 also aggregates together the updated user presence status for all of the users in the user group, in order to update the group presence status. In some embodiments, only the super peer terminal performs the latter aggregation for updating the group presence status. After task 805, task execution proceeds to task 604.

Figure 9:
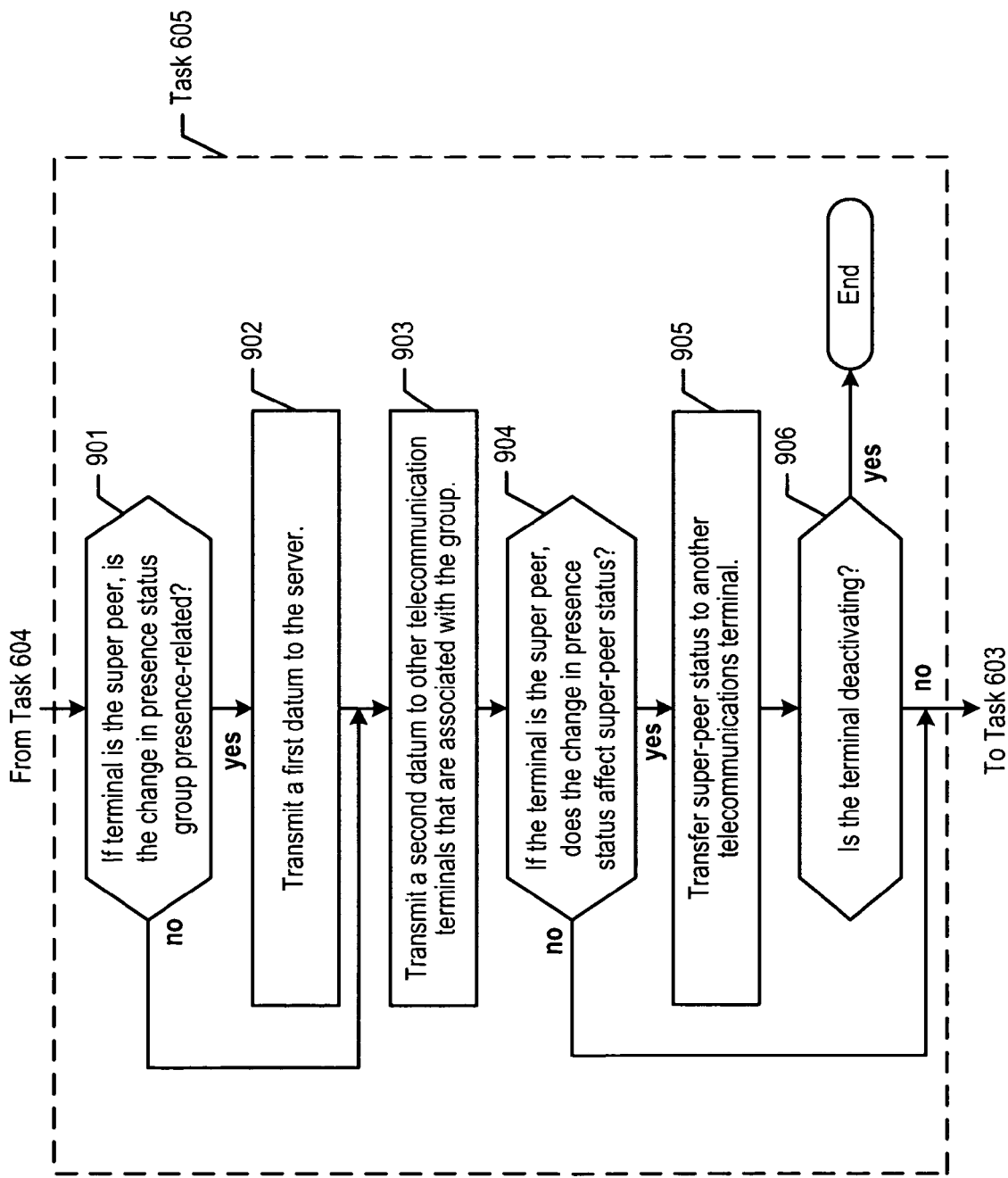
FIG. 9 depicts a flowchart of the salient operations in processing a change in presence status.

FIG. 9 depicts a flowchart of the salient operations that are associated with task 605 in processing a change in presence status, in accordance with the illustrative embodiment of the present invention. It will be clear to those skilled in the art which tasks depicted in FIG. 9 can be performed simultaneously or in a different order than that depicted.

At task 901, terminal 201-2, if it is currently the super peer, determines if the change in presence status is group presence-related. If the change is group presence-related, as is known in the art, task execution proceeds to task 902. Otherwise, the change in presence status is user presence-related, as is known in the art, and task execution proceeds to task 903.

At task 902, terminal 201-2 transmits a first datum or data to one or more of servers 204-1 through 204-N. The data can refer to one or more of a call log, a contact list of one or more updated contacts, or a presence status, alone or in combination. Terminal 201-1 uses a communication mode, such as Short Message Service, Web Services, or Session Initiation Protocol, to transmit the data. The communication mode can be based on one or more of the property states monitored in tasks 801 through 803.

At task 903, terminal 201-2 transmits a second datum or data to other telecommunications terminals in the peer group. The data can refer to one or more of a call log, a contact list of one or more updated contacts, or a presence status, alone or in combination. Terminal 201-1 uses the current communication mode, such as Short Message Service, Web Services, or Session Initiation Protocol, to transmit the data. The communication mode used to transmit peer-to-peer can be based on one or more of the property states monitored in tasks 801 through 803. Furthermore, the communication mode can be either the same as or different from the communication mode that is used in task 902 to transmit the data to the servers. Terminal 201-2, regardless of its super-peer status and the type of presence status to which a change occurred, transmits the data to the other telecommunications terminals in the peer group. The rationale for propagating the information to the other terminals is that the other terminals are then able to keep current on every user's individual presence. The transmitted data might be the same as that transmitted at task 902, or it might be different.

At task 904, terminal 201-2, if it currently is the super peer, determines whether the change in presence status affects its super-peer status. If the change does affect the status, task execution proceeds to task 905. Otherwise, task execution proceeds to task 603.

At task 905, terminal 201-2, transfers its super-peer status to another telecommunications terminal in the peer group. As those who are skilled in the art will appreciate, terminal 201-1 can select the transferred-to terminal based on that terminal's capability, its history of availability, the user of the terminal, and so forth.

At task 906, terminal 201-2 determines if it is deactivating (e.g., powering down, etc.). If it is deactivating, task execution ends. Otherwise, task execution proceeds to task 603.

FIG. 10 depicts the tasks depicts a state diagram related to monitoring the terminal-related user activity of a user (e.g., user $U_2$, etc.) at a terminal (e.g., terminal 201-2, etc.), in accordance with the illustrative embodiment of the present invention. State diagram 1000 comprises active state 1001, inactive state 1002, and state transitions 1011 through 1014. Based on the changes in user-activity state, the monitoring terminal aggregates this fine-grained presence indication along with other fine-grained presence indications to determine an aggregated user presence status. As those who are skilled in the art will appreciate, in some alternative embodiments, other states and state transitions may be considered.

FIG. 11 depicts the tasks depicts a state diagram related to monitoring a user's (e.g., user $U_2$, etc.) voice call activity, in accordance with the illustrative embodiment of the present invention. State diagram 1100 comprises states 1101 through 1106 and state transitions 1111 through 1119. Based on the changes in the user's voice activity, the monitoring terminal aggregates this fine-grained presence indication along with other fine-grained presence indications to determine an aggregated user presence status. As those who are skilled in the art will appreciate, in some alternative embodiments, other states and state transitions may be considered.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A first telecommunications terminal of a hybrid peer-to-peer network comprising:
   at least one hardware processor for detecting a) a change in a group-presence status of a user group and b) a change in presence of one of the users in the user group, a user of the first telecommunications terminal and a user of a second telecommunications terminal of the hybrid peer-to-peer network belonging to the user group, the second telecommunications terminal being peer of the first telecommunications terminal, and the group-presence status being based on whether a quorum of users in the user group is available; and
   a transmitter for transmitting:
   (a) a first datum including aggregated presence information of the user group including the group-presence status to a server of the hybrid peer-to-peer network, based on the detecting of the change in the group-presence status; and
   (b) a second datum to the second telecommunications terminal, through a routing intelligence that is distributed among the terminals, and not through any server of the peer-to-peer network, based on (i) the detecting of the change in presence of one of the users and (ii) the user of the second telecommunications terminal belonging to the user group.

2. The first telecommunications terminal of claim 1 wherein the first datum refers to the group-presence status.

3. The first telecommunications terminal of claim 1, wherein the group-presence status is based on whether a quorum of users in the user group is available.

4. The first telecommunications terminal of claim 1, wherein the group-presence status is based on whether a majority of users in the user group is available.

5. The first telecommunications terminal of claim 1, wherein the group-presence status is based on whether all members of the user group are available.

6. A method comprising:
   detecting, by at least one hardware processing unit, at a first telecommunications terminal of a hybrid peer-to-peer network, a) a change in a group-presence status of a user group and b) a change in presence of one of the users in the user group, a user of the first telecommunications terminal and a user of a second telecommunications terminal of the hybrid peer-to-peer network belonging to the user group, the second telecommunications terminal being peer of the first telecommunications terminal, and the group-presence status being based on whether a quorum of users in the user group is available;
   transmitting a first datum including aggregated presence information of the user group including the group-presence status from the first telecommunications terminal to a server of the hybrid peer-to-peer network, based on the detecting of the change in the group-presence status; and
   transmitting a second datum from the first telecommunications terminal to the second telecommunications terminal, through a routing intelligence that is distributed among the terminals, and not through any server of the peer-to-peer network, based on (i) the detecting of the change in presence of one of the users and (ii) the user of the second telecommunications terminal belonging to the user group.

7. The method of claim 6 wherein the first datum refers to a call log.

8. The method of claim 6 wherein the first datum refers to a contact list.

9. The method of claim 6 wherein the first datum refers to the group-presence status.

10. The method of claim 6, wherein the group-presence status is based on whether a quorum of users in the user group is available.

11. The method of claim 6, wherein the group-presence status is based on whether a majority of users in the user group is available.

12. The method of claim 6, wherein the group-presence status is based on whether all members of the user group are available.

* * * * *